(12) United States Patent
Jenkins et al.

(10) Patent No.: US 6,724,618 B1
(45) Date of Patent: Apr. 20, 2004

(54) HOUSING FOR A PORTABLE ELECTRONIC DEVICE

(75) Inventors: Ian Jenkins, Stony Brook, NY (US); Mike Horan, St. James, NY (US); Carl Thelemann, East Islip, NY (US); Roland W. F. Lee, Flushing, NY (US); Israel Aran, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 101 days.

(21) Appl. No.: 09/925,184

(22) Filed: Aug. 9, 2001

(51) Int. Cl.[7] .................................................. G06F 1/16
(52) U.S. Cl. ........................ 361/684; 361/679; 361/683; 439/133; 455/90
(58) Field of Search ................................ 361/681, 683, 361/684, 737, 753, 814; 439/218, 331, 486, 492, 509, 159, 160, 638, 630; 455/90, 550, 558; 235/492, 439, 440, 441, 451, 475, 483, 486; 379/428, 429, 433; 206/706, 716, 711, 712; 211/41.17

(56) References Cited

U.S. PATENT DOCUMENTS

| | | | |
|---|---|---|---|
| 5,180,891 A | | 1/1993 | Trumbo |
| 5,257,414 A | * | 10/1993 | Trahan et al. .................. 455/90 |
| 5,373,458 A | | 12/1994 | Bishay et al. |
| 5,422,442 A | | 6/1995 | Gouda et al. |
| 5,436,969 A | * | 7/1995 | Kobayashi ............. 379/433.09 |
| 5,515,303 A | | 5/1996 | Cargin, Jr. et al. |
| 5,615,250 A | * | 3/1997 | Kobayashi ................... 455/550 |
| 5,625,688 A | * | 4/1997 | Ford et al. ............. 379/433.09 |
| 5,790,659 A | * | 8/1998 | Strand ..................... 379/433.09 |
| 5,805,416 A | | 9/1998 | Friend et al. |
| 5,831,256 A | * | 11/1998 | De Larminat et al. ...... 235/486 |
| 5,877,975 A | | 3/1999 | Jigour et al. |
| 5,946,395 A | * | 8/1999 | Petrella et al. ......... 379/433.01 |
| 6,062,887 A | * | 5/2000 | Schuster et al. ............ 439/218 |
| 6,222,726 B1 | | 4/2001 | Cha |
| 6,229,695 B1 | | 5/2001 | Moon |
| 6,244,894 B1 | * | 6/2001 | Miyashita .................... 439/500 |
| 6,334,786 B1 | * | 1/2002 | Lee ............................. 439/331 |
| 6,343,945 B1 | * | 2/2002 | Liikanen ..................... 439/160 |
| 6,390,855 B1 | * | 5/2002 | Chang ........................ 439/638 |
| 6,424,118 B1 | * | 7/2002 | Tu .............................. 320/115 |
| 6,450,408 B2 | * | 9/2002 | Shiue ......................... 235/492 |
| 6,455,188 B1 | * | 9/2002 | McKay et al. ................ 429/97 |
| 6,503,092 B1 | * | 1/2003 | Sato ............................ 439/159 |
| 2001/0003071 A1 | * | 6/2001 | Mansutti et al. ............ 439/133 |

* cited by examiner

Primary Examiner—Michael Dataskovsky
(74) Attorney, Agent, or Firm—Amin & Turocy, LLP

(57) ABSTRACT

An improved housing configuration for a portable electronic device is provided. The housing includes a flash card slot configured within a battery compartment of the portable electronic device to protect a flash card from outside contaminants. The housing also includes a SIM module, the SIM module having a well to provide for proper alignment with a SIM card, a freely detachable SIM card cover, and a sealing gasket to provide a seal between the well and the SIM card cover. The housing also includes a pen slot, which enables a user to more easily remove the pen with a pushing action. The housing further includes a hand strap mount, which can be easily converted into a hip-clip.

18 Claims, 10 Drawing Sheets

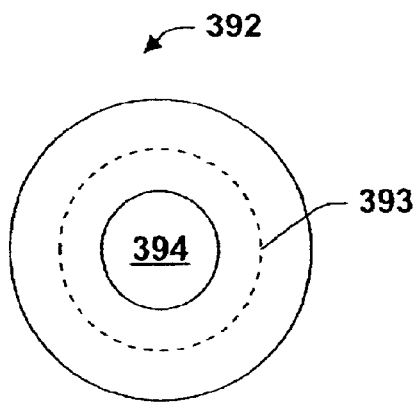
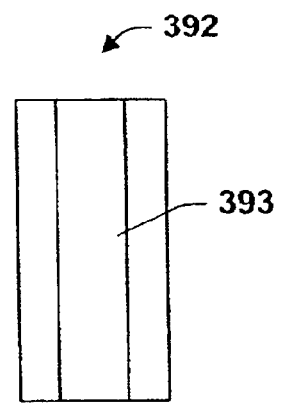
FIG. 12      FIG. 13
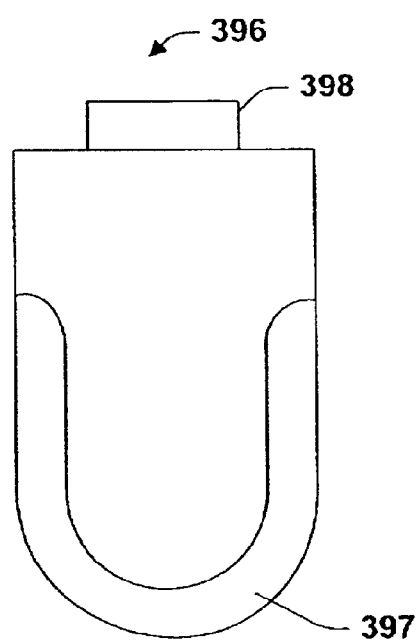
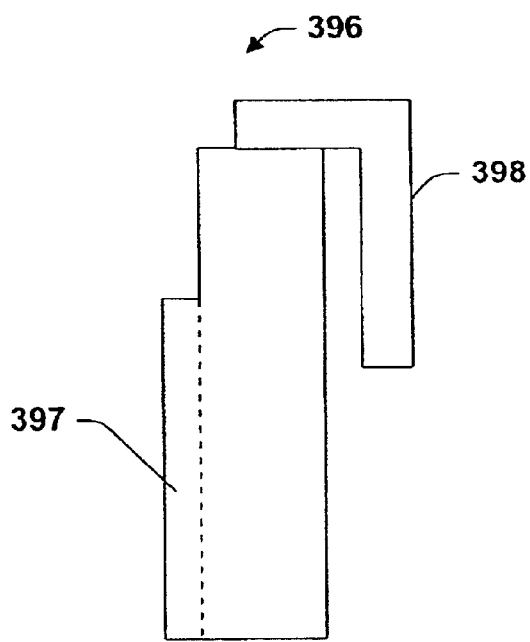
FIG. 14      FIG. 15

HOUSING FOR A PORTABLE ELECTRONIC DEVICE

FIELD OF THE INVENTION

The present invention generally relates to portable electronic devices. In particular the present invention relates an improved housing configuration for a portable electronic device.

BACKGROUND OF THE INVENTION

Hand-held portable electronic devices are used in a variety of applications, such as, for inventory control or customer service transactions, or various other commercial applications to serve as data input or output devices for central data processing and control stations. For example, the portable device may provide a route or sales person with data to the product information, cost information, customer information as well as inventory information relating to the availability of products. Thus, the compact size and ease of operation of the hand-held portable electronic device is important to its function.

Solid state memory in the form of flash memory is generally the storage of choice in a variety of mobile and hand-held devices. Unlike RAM, which is also solid-state memory, flash memory is non-volatile, which retains its stored data even after power is turned off. Typically, flash memory cards are freely inserted into an open slot formed in the surface of a handheld device. The only protection from contamination of the slot and the memory card is a moveable flap. This flap is not able to provide a tight seal to mitigate dust, moisture, and other contaminates from entering the memory card slot. Such contamination can cause permanent damage to the memory card and/or to the hand-held portable electronic device.

Also included in many portable electronic devices is a SIM (Subscriber Identity Module) card, which stores all the subscriber-related information data for the portable electronic device. Generally, SIM cards are available in two types, namely a postage stamp type and a credit card type. Conventional SIM cards, regardless of their type, typically occupy a relatively large area, which is contradictory to the current trend toward manufacturing more compact, light-weight terminals. In the postage stamp type SIM card, a SIM card reader is installed on a main PCB (Printed Circuit Board) of a body and the SIM card is electrically connected to the SIM card reader by means of a SIM card contact device. Consequently, the SIM card reader and contact device occupy a relatively large area on the body of the portable electronic device, limiting the compactness of the device body, thereby decreasing product competitiveness.

Another feature available for hand-held portable electronic devices is a touch screen and pen combination, which allows a user to input information to the device without the need for keyboard and/or mouse interfaces. Clip configurations are typically provided on the hand-held devices to hold the pen in place. The user is thus required to pull on the pen in order to remove it from the clip configuration.

Accordingly, there is a strong need in the art to provide an improved housing configuration for a hand-held portable electronic device to overcome the aforementioned problems.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

According to one aspect of the present invention, a flash card slot is provided in a portable electronic device. The flash card slot is located within a compartment of the portable electronic device to protect the flash card from outside contaminants. The flash card slot also includes an ejection mechanism coupled to the slot to provide for easy removal of the flash card.

According to another aspect of the present invention, a SIM module is provided in a portable electronic device. The SIM module includes, a SIM contact device and a SIM card coupled to the SIM contact device. A SIM card cover is employed to protect the SIM card and to maintain a close connection between the SIM contact device and the SIM card. A sealing gasket is coupled to the SIM card cover to provide a better seal.

According to yet another aspect of the present invention, a system for attaching a pen to a housing of a portable electronic device is provided. The system includes a pen and a slot having an open top portion and an open bottom portion, the slot adapted to secure the pen into a position. The pen is then easily removed from the slot by pushing the pen up and out of the slot from the open bottom portion.

According to another aspect of the present invention, a system is provided for attaching a pen to a housing of a portable electronic device. The system comprises a pen, means for securing the pen; and means for enabling the pen to be pushed out of the means for securing the pen.

According to yet another aspect of the present invention, a housing for a portable electronic device includes a compact flash card slot, a SIM module, and a pen slot. The compact flash card slot and the SIM module are located within a battery compartment of the portable electronic device. The SIM module includes a SIM card cover freely detachable from the SIM module and securable to the SIM module with a screw. The pen slot is adapted to enable a pen to be pushed out of the slot from a bottom opening in the slot.

According to yet another aspect of the present invention, a system for converting a hand strap mount of a portable electronic device into a hip-clip is provided. The system includes a hand strap mount for securing a hand strap to the housing of the portable electronic device and a mushroom part. The mushroom part is coupled to the hand strap mount and is adapted to fit into a receiver, which attaches to a user's belt.

According to another aspect of the present invention, a system is provided for converting a hand strap mount of a portable electronic device into a hipclip. The system comprises means for mounting a hand strap; and means for converting the means for mounting a hand strap into means for securing the portable electronic device to a belt.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

FIG. 12 is a front view of a component of a hip-clip in accordance with one aspect of the present invention;

FIG. 13 is a side view of a component of a hip-clip in accordance with one aspect of the present invention;

FIG. 14 is a front view of a hipclip receiver in accordance with one aspect of the present invention;

FIG. 15 is a side view of a hip-clip receiver in accordance with one aspect of the present invention.

DETAILED DESCRIPTION OF THE INVENTION

Figure 1:
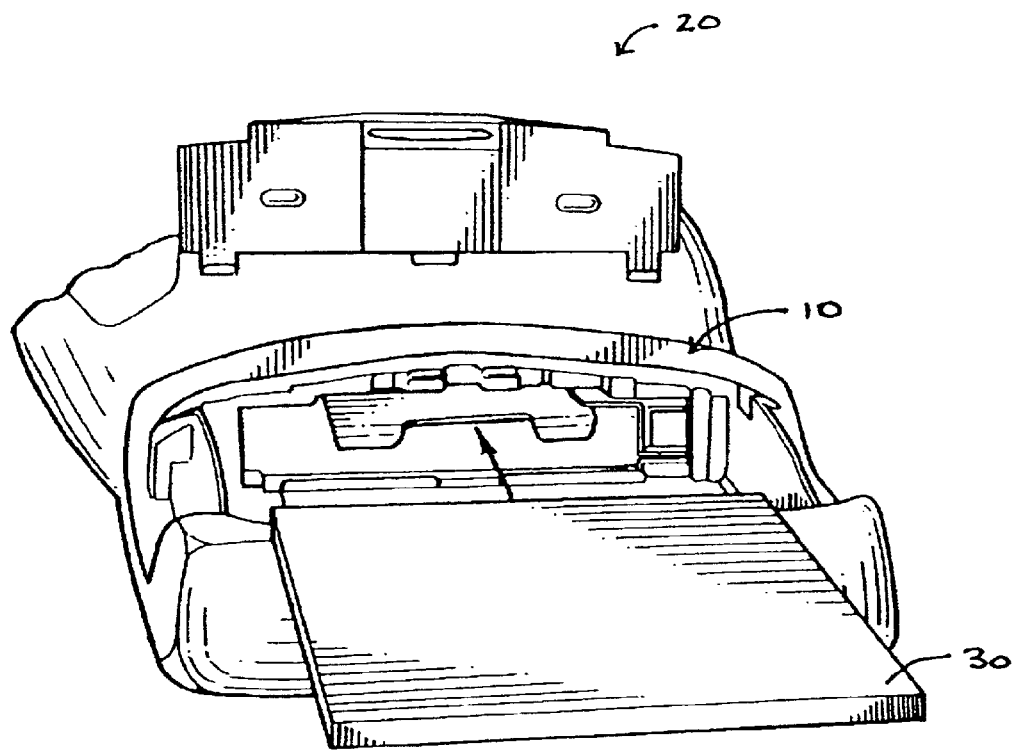
FIG. 1 is a perspective view of a compact flash card and compact flash card slot in accordance with one aspect of the present invention.

The present invention will now be described with reference to the drawings, wherein like reference numerals are used to refer to like elements throughout.

Figure 2:
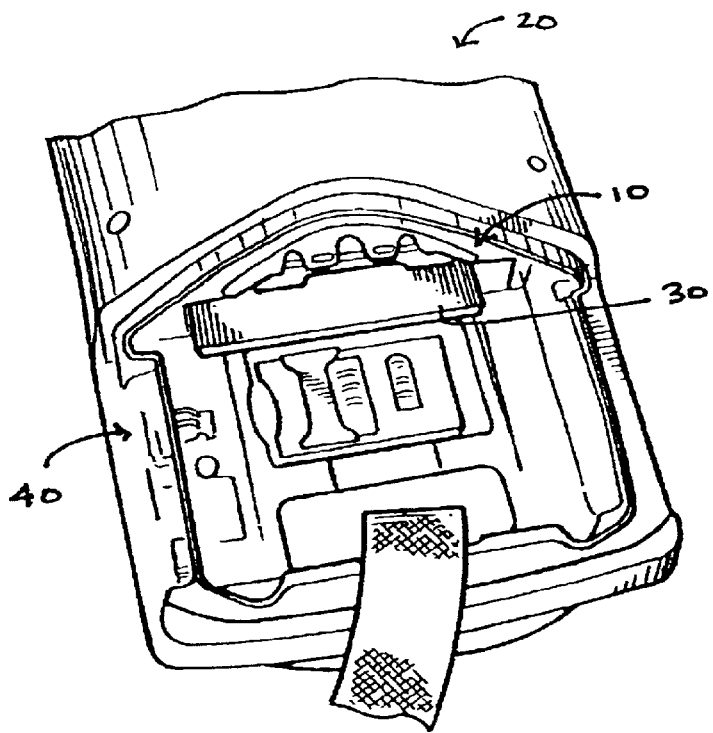
FIG. 2 is a perspective view of a compact flash card and compact flash card slot in accordance with one aspect of the present invention.

Referring initially to FIGS. 1 and 2, a flash card slot 10 is provided for a portable electronic device in accordance with one aspect of the present invention. The portable electronic device in this example is a hand-held mobile terminal 20 used in a wireless communication network for tracking inventory, storing data, etc. The flash card slot 10 is configured to receive a compact flash card 30. The compact flash card 30 is a small format flash memory card that is 36 mm×43 mm×3.3 mm, the surface area of which is approximately ⅓ the surface area of the standard PC Card. The compact flash card is employed as a memory storage medium for the hand-held mobile terminal. However, it is to be appreciated that the flash card slot can be configured to receive any other type and size of memory card for a portable electronic device, for example, a smart media card or a PCMCIA card.

In order to provide protection for the compact flash card 30 from outside contaminants, the flash card slot 10 is located within a battery compartment 40 of the hand-held mobile terminal 20. The battery compartment 40 will be described in further detail later. The location of the compact flash card slot 10 within the battery compartment 40 mitigates the possibility of foreign particles getting inside the flash card slot 10. If data transfer ports on compact flash cards are contaminated by liquids, salt deposits and/or abrasive particles, for example, retrieval of information stored on the cards may be jeopardized, and the memory cards may actually damage the electronic devices into which the cards are inserted. Additionally, static discharge onto the data transfer ports of the flash cards may destroy data stored within the cards. Thus, the flash card slot 10 in accordance with one aspect of the present invention facilitates ease of access to the compact flash card 30 while also protecting the card 30 from potential damage and/or contamination.

Adjacent the insertion end of the flash card 30, on the back side of the card 30, are a plurality of data transfer ports (not shown) that may be isolated metal contacts. To mitigate a user inserting the compact flash card 30 into the electronic device upside down, or backwards, one corner of the insertion end of the card 30 may be a non-right angle, or asymmetrical corner (not shown). If the compact flash card 30 were aligned so that the data transfer or back surface was hidden from a user, and the insertion edge was the top edge, then a top right corner would be the asymmetrical corner. The top left corner is symmetrical to the bottom left corner, and the two bottom corners are symmetrical to each other. By industry standards, however, the top right corner of known flash cards is asymmetrical, which may mean that the corner is formed of two angles totaling ninety degrees.

Figure 3:
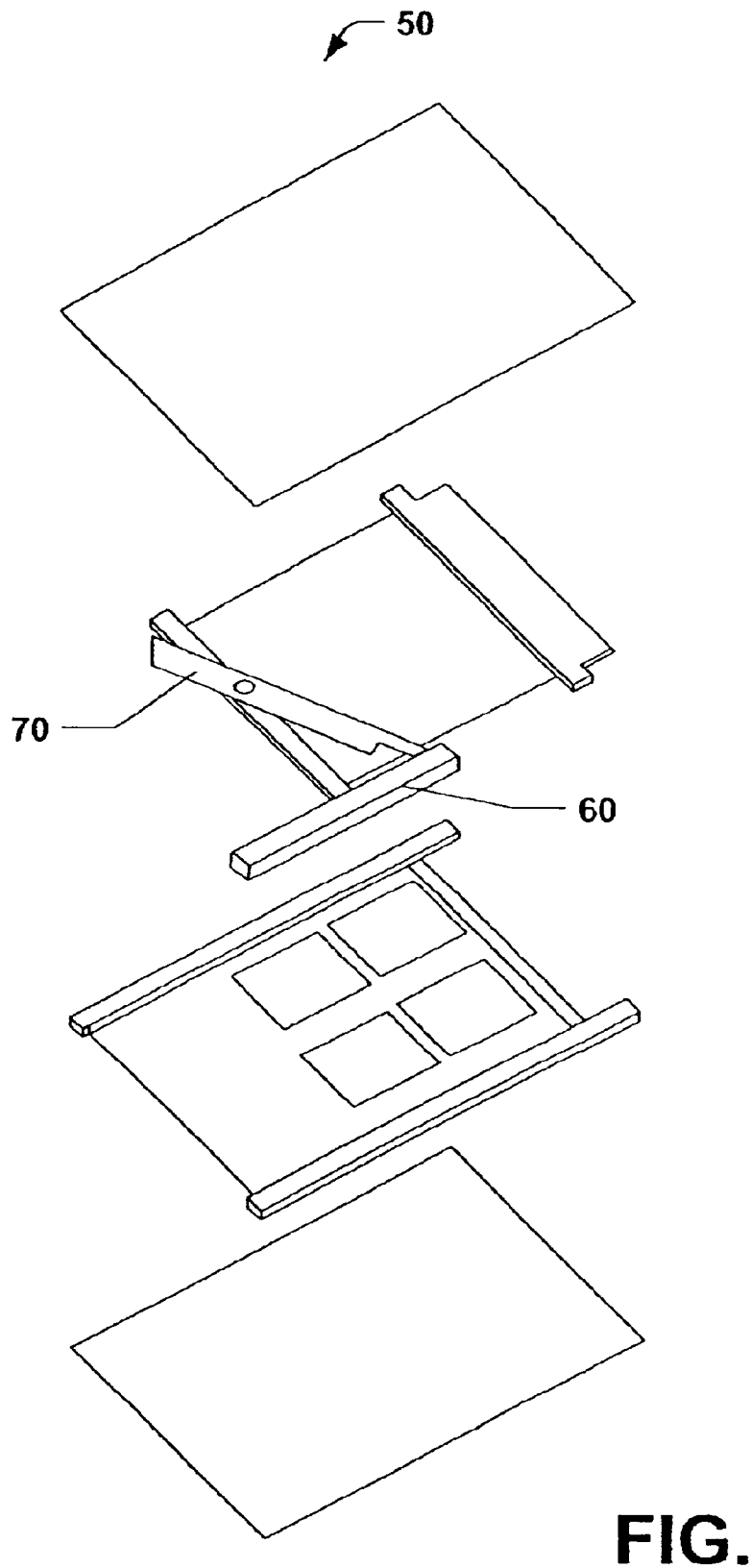
FIG. 3 is a perspective view of an ejection mechanism for a compact flash card slot in accordance with one aspect of the present invention.

As shown in FIG. 3, an ejection mechanism 50 is provided in the flash card slot 10 to easily remove the compact flash card 30 from the slot 10. According to one example, the ejection mechanism 50 comprises an ejecting shaft 60 disposed in the hand-held mobile terminal 20 in such a manner as to be slidable along the inserting and ejecting direction of the flash card 30 into which the flash card 30 is inserted. An arm 70 having a bent portion at one end is disposed in such a manner that the center portion of the arm 70 is rotatably supported by a resinous frame. The other end of the arm 70 is connected to the ejecting shaft 60. The bent portion of the arm 70 is formed in such a manner as to touch a portion of the compact flash card 30 (which portion is located alongside the signal-contact of the memory card), and to hold the flash card 30 inserted into the slot 10. In ejecting the compact flash card 30 from the flash card slot 20 having the above structure, the ejecting shaft 60 is pushed with a finger along the inserting direction of the flash card 30. The pushing force applied to the ejecting shaft 60 is conveyed to the bent portion of the arm 70, whereby the bent portion is moved along the ejecting direction touching the portion aside the signal-contact of the compact flash card 30, so that the flash card 30 is ejected. In the above description, the flash card 30 is ejected by the pushing force applied to the ejecting shaft 60. However, the above structure for suppressing the ejection of the compact flash card 30 is applicable to a flash card slot having the structure for ejecting the flash card 30 with the resilient force of a spring, which moves the flash card 30 along the ejecting direction of the flash card 30 when the flash card 30 is separated from the bent portion by pushing the ejecting shaft 60. Furthermore, the ejection mechanism may be of any other structure operable to eject a memory card from flash card slot and is contemplated as falling within the scope of the present invention.

Figure 4:
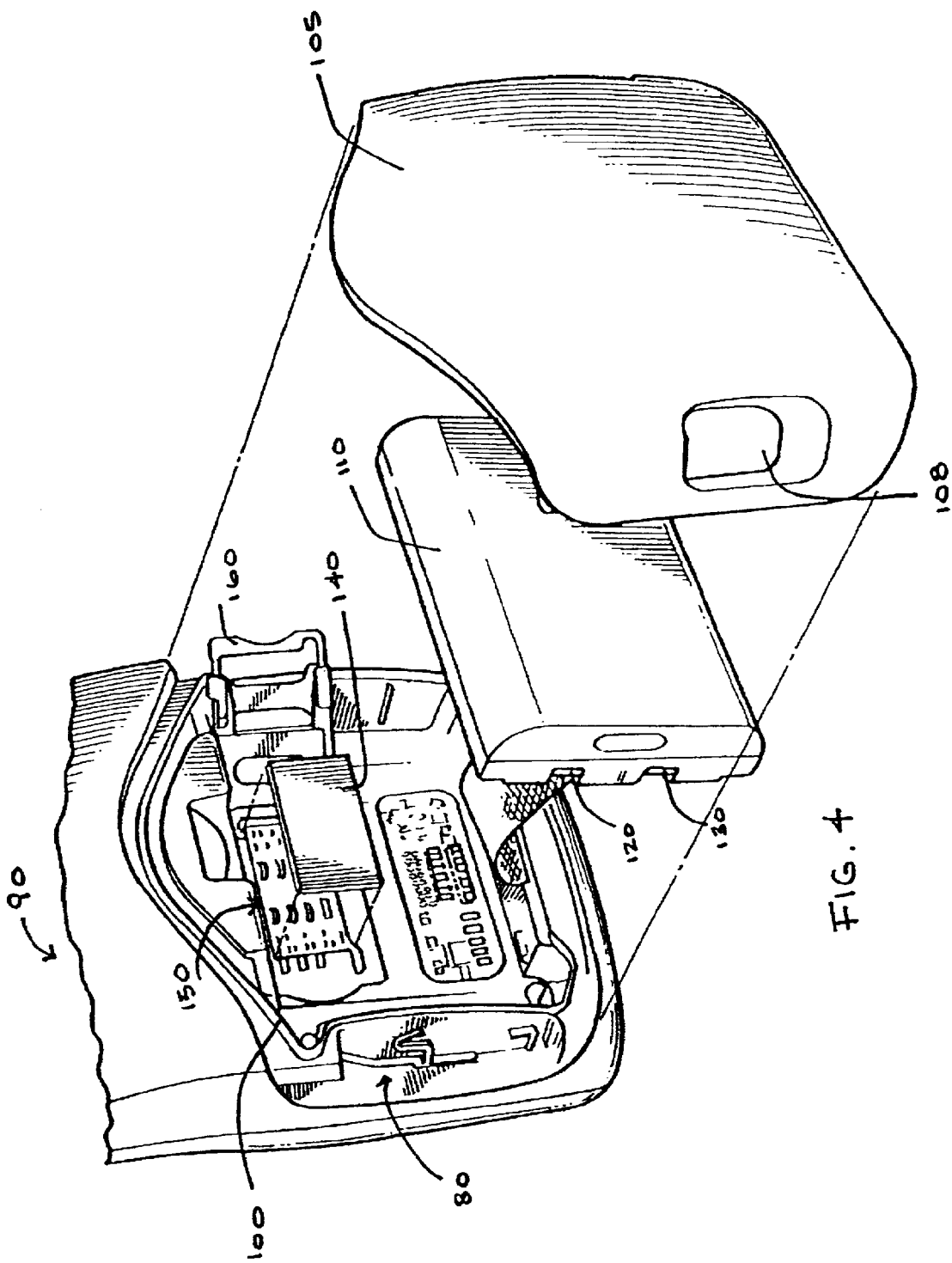
FIG. 4 is a perspective view of a battery compartment of a mobile terminal in accordance with one aspect of the present invention.

In FIG. 4, a battery compartment 80 of a hand-held mobile terminal 90 is shown in accordance with one aspect of the present invention. The battery compartment 80 contains a gasket 100 to provide a tight seal between the housing of the hand-held mobile terminal and a cover 105 for the battery compartment 80. The gasket 100 is provided around the perimeter of the opening of the battery compartment 80 and is operable to keep out contamination, which might otherwise enter the battery compartment 80 from the outside and thereby affect performance of the mobile terminal 90. The gasket 100 may be of rubber, foam, or any other elastomer, operable to sufficiently seal the battery compartment 80 of the hand-held mobile terminal 90. This seal mitigates dust and other contaminates from entering the clean environment of the battery compartment 80. The battery compartment cover 105 includes two locking tabs 108 on each side of the cover 105 to secure the battery compartment cover 105 to the mobile terminal 90. It is to be appreciated that any configuration used to secure the battery compartment cover 105 to the mobile terminal 90 may be employed.

A rechargeable lithium-ion battery pack 110 is located in the battery compartment 80 of the mobile terminal 90 and is adapted to be easily removable and installable. It is to be appreciated that the battery pack 110 may be of any type (e.g., Nickel-Cadmium, Nickel-Metal-Hydride) depending upon the application at hand. The battery pack 110 provides power to the hand-held mobile terminal 90 through electrical contacts 120 and 130 designed to correspond to contacts (not shown) located in the mobile terminal 90. Preferably, the contacts are made of a highly conductive metal that is resistant to corrosion, such as, for example, Nickel Plated Beryllium Copper.

Also included within the battery compartment 80 is a SIM (Subscriber Identity Module) card 140, which stores all the subscriber-related information data for the handheld mobile terminal 90. The SIM card 140, which may be of postage stamp type, module type or IC type, is located in the battery compartment 80 of the mobile terminal 90, as opposed to in the body of the terminal 90, to provide greater protection from outside contaminants and to use space within the hand-held mobile terminal 90 more efficiently. The SIM card 140 is comprised of a power receiver, a memory for reading and writing data, a ground, and a dummy. A SIM card contact device 150 is connected to a SIM card reader and includes a housing, a cover, a hinge, and a plurality of terminals. The SIM card 140 can be freely detached from the SIM card contact device 150. The SIM card contact device 150 is preferably mechanically fixed on the SIM card reader so as not to protrude upward with respect to the surface of the base, by inserting protrusions (not shown) formed at the four corners of the SIM card contact device 150 into holes of the SIM card reader. Terminals may be soldered onto the SIM card reader, or fixed in other ways such as through a terminal block, to maintain electrical connection.

Figure 5:
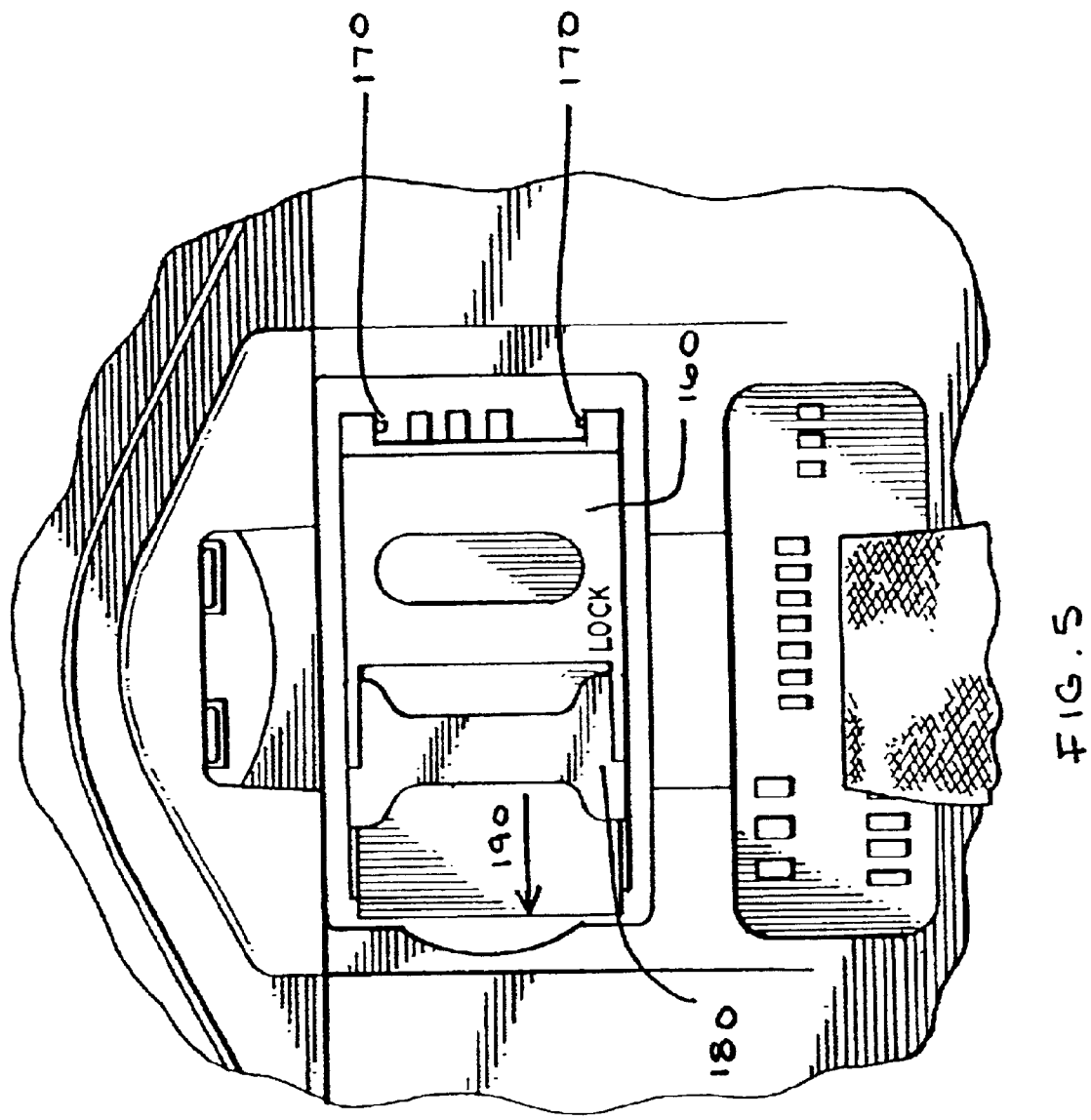
FIG. 5 is a front view of a SIM module in accordance with one aspect of the present invention.

The SIM card 140 is inserted under a SIM card cover 160, which is attached to the SIM card contact device 150. Turning now to FIG. 5, the cover 160 is attached by and rotates on hinges 170. When the cover 160 is closed, a locking mechanism 180 slidably moves in a direction indicated by 190 until the cover 160 is locked into the housing. Thus, the SIM card 140 is fixedly held in the housing. To remove the SIM card 140 from the housing, the above procedure is performed in a reverse order. That is, the locking mechanism is slidably moved in a direction opposite to that indicated by 190 and the cover 160 rotates upward from the housing. The SIM card 140 can then be removed if necessary. As described above, the SIM card 140, which stores data for subscriber identification, is detachably incorporated in the battery compartment 80 so that the space required for the SIM card 140, SIM card contact device 150, and SIM card reader on the body is decreased, providing a more compact body. Configuring the SIM card 140 and the SIM card reader as a module type or an IC type built in the battery compartment may also obtain the same result. Further, the configuration of the present invention offers the advantage of user convenience.

Figure 6:
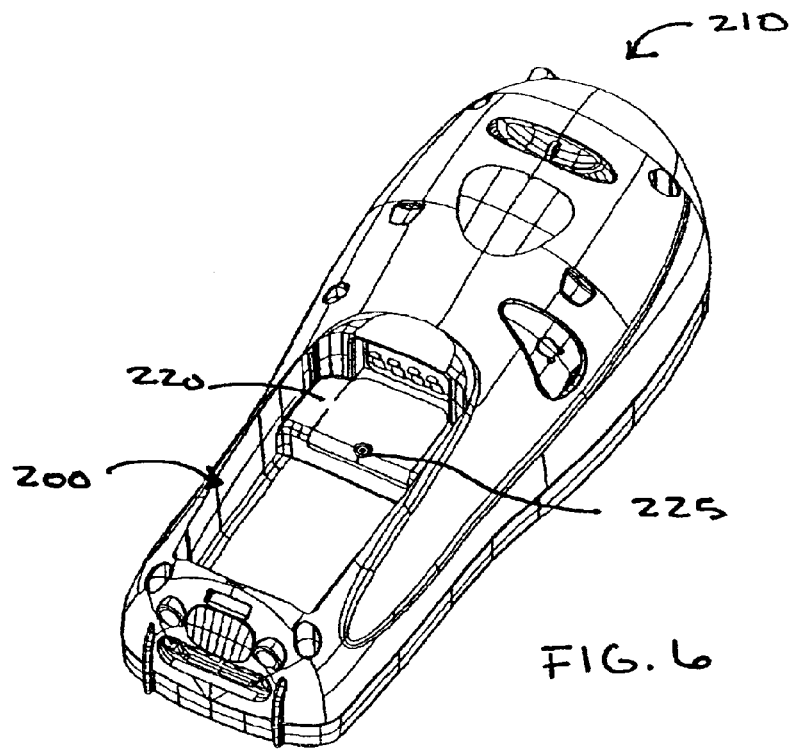
FIG. 6 is a perspective view of a SIM module in accordance with another aspect of the present invention.
Figure 7:
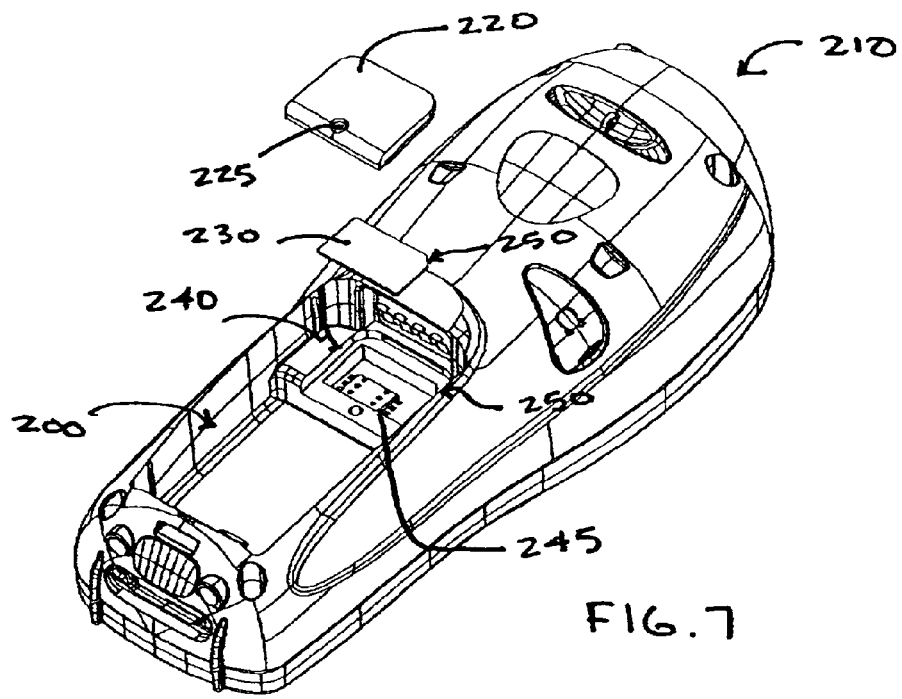
FIG. 7 is a perspective view of a SIM module in accordance with one aspect of the present invention.

In accordance with another aspect of the current invention, a SIM module is shown with respect to FIGS. 6–9. Turning now to FIG. 6, an alternate aspect of the SIM cover 160 as described with reference to FIGS. 4 and 5, is shown. Here, a SIM module is similarly configured within a battery compartment 200 of a mobile terminal 210. However, the SIM card cover assembly 220 in this example is completely removable from the SIM module. The SIM card cover assembly 220 is held in place by a screw 225. Although, it is to be appreciated that any other type of mechanism, a snap fit, for example, may be used to secure the SIM card cover assembly 220 in place. As shown in FIG. 7, when the SIM card cover assemble 220 is removed, a SIM card 230 can be placed in, or removed from, a well 240 in the SIM module. The structure of the well 240 allows for proper alignment of the SIM card 220 with a SIM connector 245. The well 240 is provided with side walls corresponding to a perimeter of the SIM card 230. The well 240 receives the SIM card 230 and, thus, mitigates the SIM card 230 from shifting laterally out of contact with the SIM connector 245. The well 240 and the SIM card 230 are provided with alignment edges such as a cropped corner 250 to facilitate proper alignment of the SIM card 230 in the SIM connector 245. However, it is to be appreciated that any suitable alignment structure could be used and this aspect of the invention is not meant to be limited to the cropped corner 250 shown in FIG. 7. Examples of other alignment structures include other key arrangements such as a tab and slot, pin and bole, etc.

Figure 8:
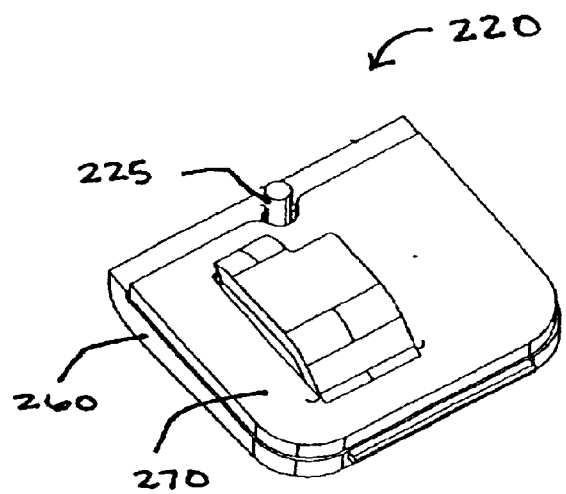
FIG. 8 is a perspective view of a SIM card cover in accordance with one aspect of the present invention.
Figure 9:
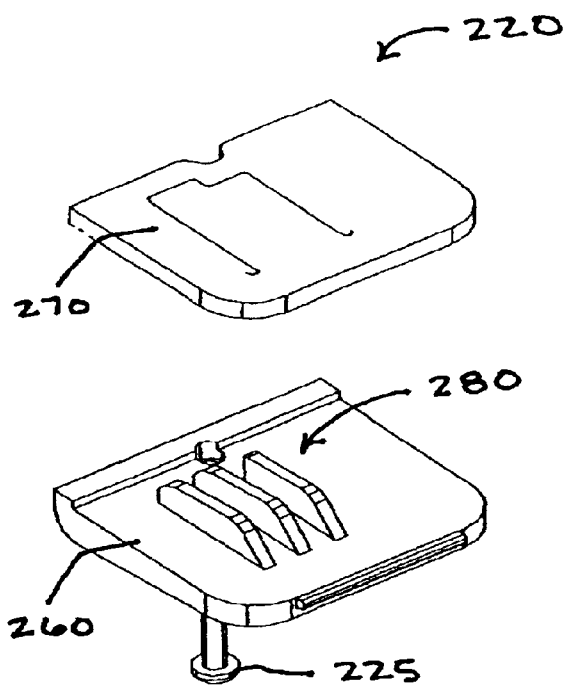
FIG. 9 is a perspective view of a SIM card cover in accordance with one aspect of the present invention.

Referring now to FIGS. 8 and 9, the SIM card cover assembly 220 is shown in greater detail in accordance with an aspect of the present invention. The SIM card cover assembly 220 generally comprises a SIM card cover 260, a sealing gasket 270 and a screw 225. On a side of a SIM card cover 260 facing the SIM card 230, there is provided one or more urging protrusions 280 that are adapted to urge the SIM card 230 into engagement with the SIM connector 245 when the SIM card cover assembly 220 is secured to the SIM module. In the closed position as shown in FIG. 6, the SIM card 230 engages one or more contacts of the SIM connector 245. The contacts are electrically coupled with the hand-held mobile terminal's 210 printed circuit board (PCB). The sealing gasket 270 is utilized to create a seal between the SIM card cover 260 and the well 240, which houses the SIM card 230. The sealing gasket 270 is operable to account for variations in tolerance present in the mating parts of the SIM card cover 260 and the well 240. The gasket 270 may be of rubber, foarn, or any other elastomer, operable to provide a seal between the mating parts of the SIM card cover 260 and the well 240. The SIM card cover 260 and sealing gasket 270 is secured to the well 240 by a screw 225. However, it is to be appreciated that any other appropriate coupling may be used to secure the SIM module components together. When the SIM card cover assembly 220 is closed and secured, the SIM card 230 is then properly engaged. No additional locking mechanism is required to contain the SIM card 230. The additional hinge and locking components as described above are unnecessary in this example, thus, decreasing component and assembly costs for the SIM module.

Figure 10:
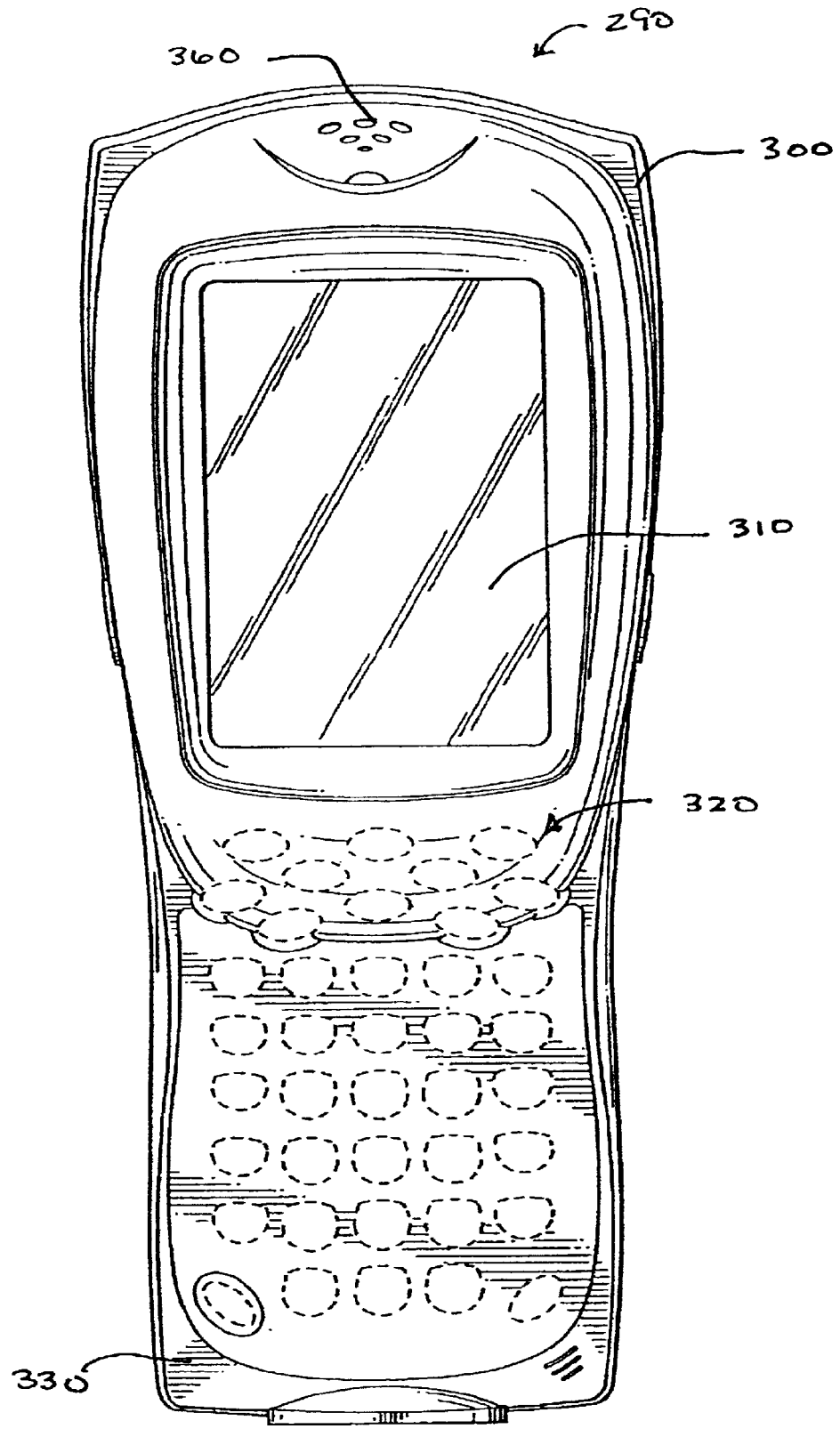
FIG. 10 is a front view of a mobile terminal in accordance with one aspect of the present invention.
Figure 11:
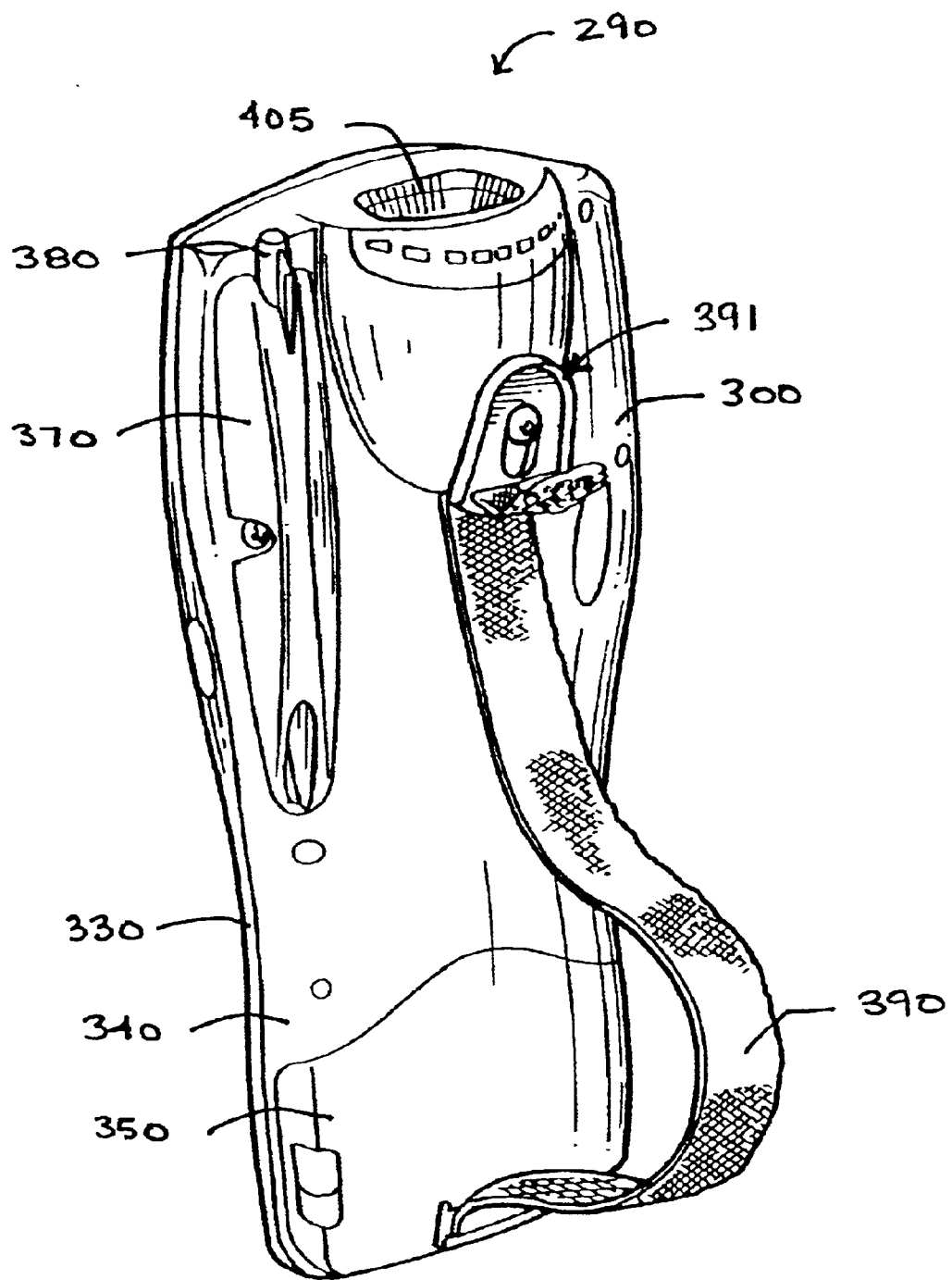
FIG. 11 is a perspective back view of a mobile terminal in accordance with one aspect of the present invention.

Turning now to FIGS. 10 and 11, pictorial representations of front and back views, respectively, of a hand-held mobile terminal 290 are shown. The user may input and/or process data via a keypad, bar code scanner, etc. independent of the hand-held mobile terminal 290 being connected to a LAN, for example. When the mobile terminal 290 does not include a radio to provide for real time communications of data to a LAN, the data is stored in memory within the hand-held mobile terminal 290. In such circumstances, when the mobile terminal 290 is eventually connected to a LAN, the data can be transmitted to a host computer (not shown). It will be appreciated that the portable device could also be any other device that is portable in nature and having electronic circuitry therein in accordance with the present invention. For example, the portable device could be a laptop computer or notebook computer, a PDA, or even a cellular telephone or pager, which includes a compact flash card and/or SIM card.

In FIG. 10, the mobile terminal 290 includes a housing 300, a touch screen 310 and a set of user interface keys 320. Both the touch screen 310 and the user interface keys 320 can be used for allowing a user to input information and/or operational commands. The touch screen 310 is further used to display information to the user and may employ capacitive, resistive touch, infrared, surface acoustic wave, or grounded acoustic wave technology. The user interface keys 320 may include a full alphanumeric keypad, function keys, enter keys, etc. The described components 310 and 320 are located in the housing 300 that is an elongated enclosure of a size and includes such contours as to conveniently fit into the open palm of the user. The housing 300 may be comprised of a number of shell portions such as for example front and rear shells 330 and 340 (FIGS. 10 and 11) as well as a battery compartment cover 350 (FIG. 11). A speaker 360 is also included to transmit and/or receive audio information to and from the user.

Turning now to FIG. 11, a perspective back view of the mobile terminal 290 is shown. The mobile terminal 290 includes a pen slot 370 for holding a pen 380, which can be utilized to activate the touch screen 310. The pen slot 370 is designed so that a user is able to push the pen 370 out of the slot 370 rather than needing to pull the pen 370 out by the clip end, as is done in conventional designs. The pen slot 370 is located at the back of the hand-held mobile terminal 290, however it is to be appreciated that the pen slot 370 may be located anywhere on the mobile terminal 290. Openings are provided at the top and bottom of the pen slot 370, in which the top and bottom portions of the pen 380 are accessible. Thus, the user can insert the pen 380 into the top opening of the pen slot 370 until the pen 380 is fitted securely within the slot 370. The pen 380 may be wider at one end, for example, due to a clip 385 located at the end, so as to mitigate the pen 380 from sliding completely through the pen slot 370. The opposite end of the pen 380 is visible through the bottom opening of the pen slot 370 when the pen 380 is fully secured within the slot 370. With this configuration, the pen 370 can be removed from the pen slot 370 by a pushing action applied to the bottom portion of the pen 380, thus, pushing the pen 380 upward and out of the slot 370. As a result, the removal of the pen 380 from the slot 370 is easier and quicker than the pulling method employed by conventional designs.

A hand strap 390 can also be included on the backside of the hand-held mobile terminal 290 for user comfort. The hand strap 390 may be attached to top and bottom portions of the hand-held mobile terminal 290. The mobile terminal may also include a "hip-clip" to allow a user to couple the hand-held mobile terminal to the user's belt. According to one aspect of the present invention, a mount 391 for the hand strap can be converted to a hip-clip. The mount can be converted to the hip-clip with a longer screw and a mushroom part. An example of a mushroom part is shown with respect to FIGS. 12 and 13. FIG. 12 illustrates a front view of the mushroom part 392. The mushroom part 392 is substantially cylindrical in shape with a recessed mid portion 393. The recessed mid portion 393 is also substantially cylindrical and can be better seen in FIG. 13, which illustrates a side view of the mushroom part 392. A hole 394 is provided through the center of the mushroom part 392 and is adapted to receive a screw for mounting the mushroom part 392 to the hand-held mobile terminal 290. It is to be appreciated that the mushroom part 392 may be of any shape with a recessed mid portion, such as a square, and is contemplated as falling within the scope of the present invention. Furthermore, the mushroom part 392 may be mounted to the hand-held mobile terminal 290 in any other manner sufficient to secure the mushroom part 392 to the terminal 290. In accordance with one aspect of the present invention, the hand strap mount 391 of the mobile terminal 290 is converted to the hip-clip by removing the screw in the hand strap mount 391, positioning the mushroom part 392 over the hand strap mount 391, and using a longer screw to secure the mushroom part 392 to the terminal 290.

Turning now to FIGS. 14 and 15, a front view and side view, respectively, of a hipclip receiver 396 is shown. The hip-clip receiver has a lip 397 adapted to receive the recessed mid portion 393 of the mushroom part 392. Thus, the hip-clip can be easily secured and removed from the hip-clip receiver 396 in a slidable motion. The hip-clip receiver 396 also includes a clip portion 398 to secure the receiver 396 to a belt or waistband. Thus, allowing the mobile terminal 290 to be coupled to a user's belt or waistband without the need for a conventional holster.

Turning back to FIG. 11, the mobile terminal 290 further includes a window 405 in which a bar code reader is able to read a bar code label, or the like, presented to the mobile terminal 290. The mobile terminal 290 can include a LED (not shown) that is illuminated to reflect whether the bar code has been properly or improperly read. Alternatively, or additionally, a sound may be emitted from the speaker 360 to alert the user that the bar code has been successfully imaged and decoded.

Figure 16:
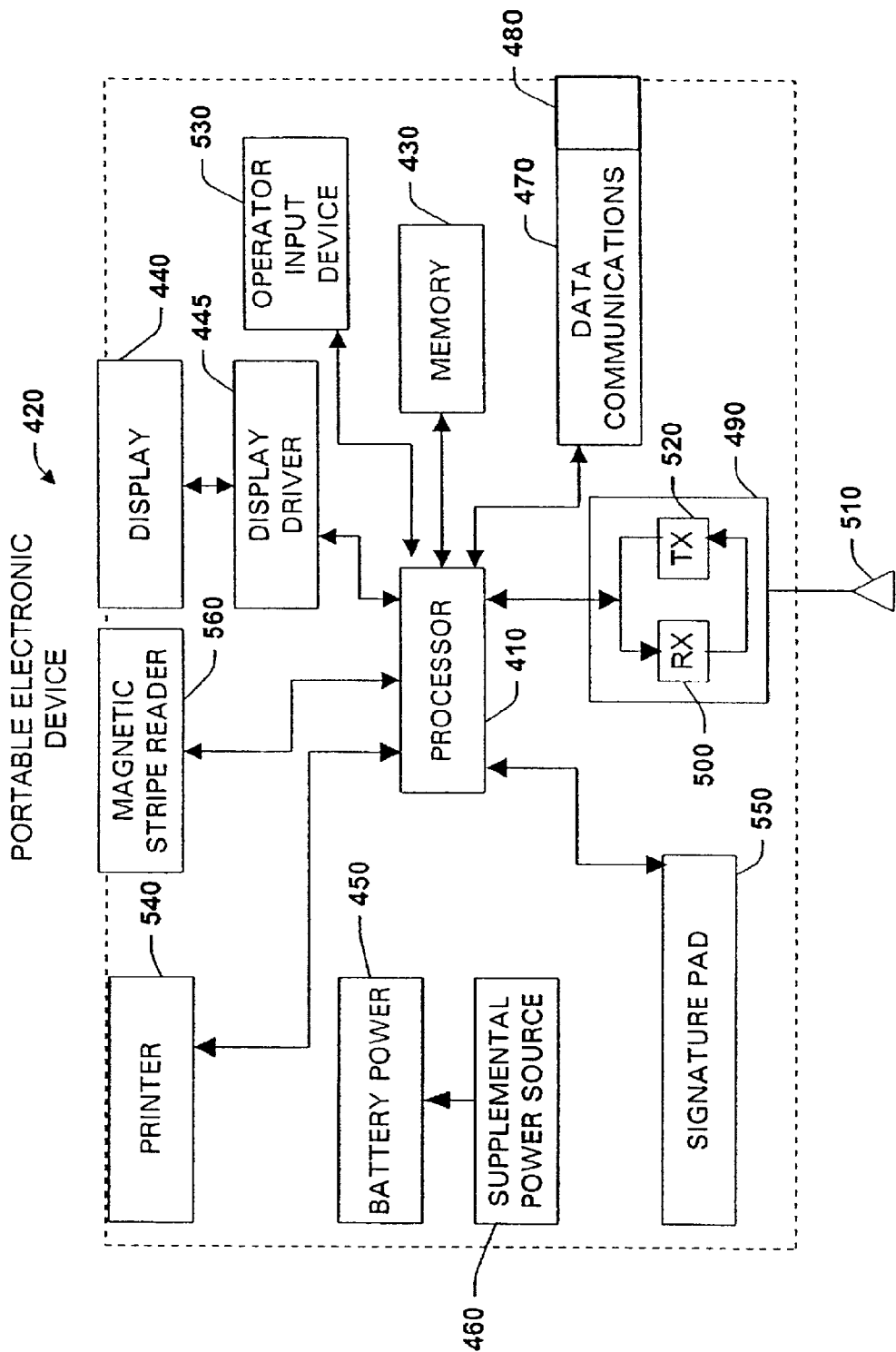
FIG. 16 is a schematic block diagram of a general operation of a mobile terminal in accordance with one aspect of the present invention.

Turning now to FIG. 16, a schematic representation according to one aspect of the present invention is shown in which a processor 410 is responsible for controlling the general operation of a hand-held mobile terminal 420. The processor 410 is programmed to control and operate the various components within the mobile terminal 420 in order to carry out the various functions described herein. The processor or CPU 410 can be any of a plurality of suitable processors. The manner in which the processor 410 can be programmed to carry out the functions relating to the present invention will be readily apparent to those having ordinary skill in the art based on the description provided herein.

A memory 430 tied to the processor 410 is also included in the hand-held mobile terminal 420 and serves to store program code executed by the processor 410 for carrying out operating functions of the hand-held mobile terminal 420 as described herein. The memory 430 also serves as a storage medium for temporarily storing information such as receipt transaction information and the like. The memory 430 is adapted to store a complete set of the information to be displayed. According to one aspect, the memory 430 has sufficient capacity to store multiple sets of information, and the processor 410 could include a program for alternating or cycling between various sets of display information. A display 440 is coupled to the processor 410 via a display driver system 445. The display 440 may be a liquid crystal display (LCD) or the like. In this example, the display 440 is a ¼ VGA display with 16 levels of gray scale. The display 440 functions to display data or other information relating to ordinary operation of the hand-held mobile terminal 420. For example, the display 440 may display a set of customer information, which is displayed to the operator and may be transmitted over a system backbone (not shown). Additionally, the display 440 may display a variety of functions that control the execution of the mobile terminal 420. The display 440 is capable of displaying both alphanumeric and graphical characters. Power is provided to the processor 410 and other components forming the band-held mobile terminal 420 by a battery pack 450. In the event that the battery pack 450 fails or becomes disconnected from the mobile terminal 420, a supplemental power source 460 provides power to the processor 410. The mobile terminal 420 may enter a minimum current draw of sleep mode upon detection of a battery failure.

The mobile terminal 420 includes a communication subsystem 470 that includes a data communication port 480, which is employed to interface the processor 410 with the main computer. The mobile terminal 420 also optionally includes an RF section 490 connected to the processor 410. The RF section 490 includes an RF receiver 500, which receives RF transmissions from the main computer for example via an antenna 510 and demodulates the signal to obtain digital information modulated therein. The RF section 490 also includes an RF transmitter 520 for transmitting information to the main computer, for example, in response to an operator input at a keypad 530 or the completion of a transaction. Peripheral devices, such as a printer 540, signature pad 550, and magnetic stripe reader 560, can also be coupled to the mobile terminal 420 through the processor 410.

Although the invention has been shown and described with respect to a certain preferred aspect or aspects, equivalent alterations and modifications will occur to others skilled in the art upon reading and understanding this specification and the annexed drawings. In particular regard to the various functions performed by the above described components (systems, assemblies, systems, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary aspect or aspects of the invention. In addition, while a particular feature of the invention may have been described above with respect to only one of several aspects, such feature may be combined with one or more other features of the other aspects, as may be desired and advantageous for any given or particular application. Furthermore, to the extent that the term "includes" is used in either the detailed description or the claims, such term is intended to be inclusive in a manner similar to the term "comprising".

What is claimed is:

1. A portable electronic device, comprising:
   a slot adapted to receive a flash card, the slot being located in a battery compartment of the portable electronic device;
   the battery compartment of the portable electronic device being sealed from the outside environment;
   an ejection mechanism coupled to the slot, and
   a pen slot attached to the electronic device, the pen slot enables a pen to be pushed out therefrom via a bottom opening associated therewith.

2. The portable electronic device of claim 1, the flash card being a compact flash card.

3. The portable electronic device of claim 1, the flash card being a smart media card.

4. The portable electronic device of claim 1, the flash card being a PCMCIA card.

5. The portable electronic device of claim 1, the battery compartment further housing a SIM module.

6. The portable electronic device of claim 1, the compartment comprising a sealing gasket operable to provide a seal between a housing of the portable electronic device and a cover of the battery compartment.

7. The system of claim 6, the sealing gasket comprising an elastomer.

8. A portable electronic device, comprising:
   a compact flash card;
   a slot adapted to receive the compact flash card and located within a battery compartment of the portable electronic device;
   a sealing gasket operable to seal contents within the battery compartment from contaminants in the outside enviroment;
   an ejection mechanism coupled to the slot for ejecting the compact flash card, and
   a pen slot that guides a sliding pen into a secure position within the portable electronic device.

9. A portable electronic device, comprising:
   a housing having a compartment including a slot with an ejection mechanism attached thereto, adapted to receive a flash card;
   a SIM contact device;
   a SIM card coupled to the contact device, the SIM card being able to be freely detached from the SIM contact device;
   a SIM card cover, the cover being employed to protect the SIM card and to maintain a close connection between the SIM contact device and the SIM card;
   a sealing gasket coupled to the SIM card, and
   a pen compartment as part of the housing, the pen compartment with a slot that enables a pen to be pushed out therefrom or thereinto.

10. The portable electronic device of claim 9, the SIM contact device being located in a well in a battery compartment of the portable electronic device.

11. The portable electronic device of claim 10, the well having sidewalls adapted to properly align the SIM card within the well.

12. The portable electronic device of claim 11, the wall and the SIM card having cropped corners to ensure proper alignment of the SIM card within the well.

13. A portable electronic device, comprising:
   a housing having a compartment including a slot with an ejection mechanism attached thereto, adapted to receive a flash card;
   a SIM contact device located in well of a battery compartment for the portable electronic device;

a SIM card coupled to the contact device, the SIM card being able to be freely detached from the SIM contact device;

a SIM card cover, the cover being employed to protect the SIM card and to maintain a close connection between the SIM contact device and the SIM card, the SIM card cover being secured to the well by a screw; and a sealing gasket coupled to the SIM card cover.

14. The portable electronic device of claim 13, the sealing gasket provided between the SIM card cover and the well to ensure a seal between the SIM card cover and the well.

15. The portable electronic device of claim 10, the SIM card cover being freely detachable from the portable electronic device.

16. A portable electronic device, comprising:

a housing having a compartment including a slot with an ejection mechanism attached thereto, adapted to receive a flash card;

a SIM contact device located in well of a battery compartment for the portable electronic device;

a SIM card coupled to the contact device, the SIM card being able to be freely detached from the SIM contact device;

a SIM card cover, the cover being employed to protect the SIM card and to maintain a close connection between the SIM contact device and the SIM card, the SIM card cover having at least one protrusions on a side facing the SIM card, the at least one protrusion capable of engaging the SIM card with the SIM contact device; and a sealing gasket coupled to the SIM card cover.

17. A housing for a portable electronic device, comprising:

a compact flash card slot, the compact flash card slot being located within a battery compartment of the portable electronic device;

a SIM module located within the battery compartment of the portable electronic device, the SIM module including a SIM card cover freely detachable from the SIM module and securable to the SIM module with a screw; and a pen slot adapted to enable a pen to be pushed out of the slot from a bottom opening in the slot.

18. A portable electronic device, comprising:

means to receive a flash card, the means for receiving the flash card being located within a means for housing a power supply for the portable electronic device;

means for ejecting the flash card; and means for enabling a pen to be pushed into or out from a compartment of the portable electronic device.

* * * * *

UNITED STATES PATENT AND TRADEMARK OFFICE
CERTIFICATE OF CORRECTION

PATENT NO. : 6,724,618 B1
DATED : April 20, 2004
INVENTOR(S) : Ian Jenkins et al.

It is certified that error appears in the above-identified patent and that said Letters Patent is hereby corrected as shown below:

<u>Title page,</u>
Item [57], ABSTRACT,
Line 10, delete the word "more"

<u>Column 2,</u>
Line 55, replace "hipclip" with -- hip-clip --
Line 60, replace "bereinafler" with -- hereinafter --

<u>Column 3,</u>
Line 59, replace "36mmx43 mmx3.3 mm" with -- 36mm x 43mm x 3.3mm --

<u>Column 5,</u>
Line 35, replace "handheld" with -- hand-held --

<u>Column 6,</u>
Line 29, replace "shiffling" with -- shifting --
Line 38, replace "bole" with -- hole --
Line 57, replace "foarn" with -- foam --

<u>Column 9,</u>
Line 18, replace "band-held" with -- hand-held --

<u>Column 10,</u>
Line 30, replace "enviroment" with -- environment --
Line 49, replace "card" with -- card cover --
Line 59, replace "wall" with -- well --

Signed and Sealed this

Thirtieth Day of November, 2004

JON W. DUDAS
*Director of the United States Patent and Trademark Office*